United States Patent
Maekawa

(10) Patent No.: US 8,123,370 B2
(45) Date of Patent: Feb. 28, 2012

(54) MULTIPLE-VIEWING-POINT FLOATING IMAGE DISPLAY DEVICE

(75) Inventor: Satoshi Maekawa, Tokyo (JP)

(73) Assignee: National Institute of Information and Communications Technology, Koganei-shi (JP)

( * ) Notice: Subject to any disclaimer, the term of this patent is extended or adjusted under 35 U.S.C. 154(b) by 358 days.

(21) Appl. No.: 12/530,002

(22) PCT Filed: Mar. 4, 2008

(86) PCT No.: PCT/JP2008/053821
§ 371 (c)(1),
(2), (4) Date: Sep. 4, 2009

(87) PCT Pub. No.: WO2008/111426
PCT Pub. Date: Sep. 18, 2008

(65) Prior Publication Data
US 2010/0073751 A1    Mar. 25, 2010

(30) Foreign Application Priority Data
Mar. 5, 2007    (JP) .................. 2007-054871

(51) Int. Cl.
*G02B 5/08* (2006.01)
*G02B 27/10* (2006.01)
*G02B 7/182* (2006.01)

(52) U.S. Cl. ........ 359/857; 359/627; 359/628; 359/851; 353/99

(58) Field of Classification Search .......... 359/627–628, 359/850–851, 857, 861; 353/99
See application file for complete search history.

(56) References Cited

U.S. PATENT DOCUMENTS
7,054,067 B2    5/2006 Okano et al.

FOREIGN PATENT DOCUMENTS
JP    2005-010755 A    1/2005
WO    2007/116639 A1    10/2007

OTHER PUBLICATIONS

International Search Report of PCT/JP2008/053821, mailing date of Jun. 10, 2008.
S. Maekawa et al., Bisho 2-men Corner Reflector Array o Mochiita Mentaisho Ketsuzo Kogaku Soshi:, ITE Technical Report, Oct. 18, 2006, pp. 49 to 52; Cited in ISR.
S. Maekawa et al., "Transmissive Optical Imaging Device with Micromirror Array", Proceedings of SPIE, Oct. 2006, 63920E-1-63920E-8, vol. 6392; Cited in ISR.
S. Maekawa, "2-men Corner Reflector Array ni yoru Tashiten kara Kansatsu Kano na Kukan Eizo Hyoji", Journal of Three Dimensional Images, Dec. 15, 2007, pp. 29 to 32, vol. 21, No. 4; Cited in ISR.

*Primary Examiner* — Stephone Allen
*Assistant Examiner* — Kimberly N Kakalec
(74) *Attorney, Agent, or Firm* — Westerman, Hattori, Daniels & Adrian, LLP

(57) ABSTRACT

A multiple viewing-point floating imaging device is comprised of a plurality of dihedral corner reflectors 1 arranged along an optical device plane S and rotated around an axis of rotation perpendicular to said plane, to point in a plurality of directions along said plane, whereby light rays from an object O near to said plane are reflected once each by the two mirrors of said dihedral corner reflectors while passing through said plane, forming a real image P in a plane-symmetric position, visible from multiple viewing points V1 and V2 by multiple observers simultaneously.

12 Claims, 13 Drawing Sheets

MULTIPLE-VIEWING-POINT FLOATING IMAGE DISPLAY DEVICE

FIELD OF THE INVENTION

The present invention is related to a multiple viewing-point floating imaging device, that is an optical device that allows observing the floating real image of an object simultaneously from multiple viewpoints.

BACKGROUND OF THE INVENTION

The inventor of the present invention has previously disclosed the invention of a dihedral corner reflector array optical device, consisting of multiple pairs of approximately perpendicular specular planes, and being capable of image forming (see Patent Reference No. 1). The above optical device, when an object (including physical objects and images) is placed to one of its sides, will reflect the light emitted from the above object by the aforementioned pairs of specular surfaces (heretofore called 'dihedral reflectors') while passing the reflected light through it, thus forming a reversed real image of the above object at the other side of the above optical device. The above optical device thus realizes a new way of optical imaging.

The principle of operation of the above mentioned optical device is based on the reflection of light by specular surfaces; thus it solves a problem with a-focal lens arrays using refraction by micro-lenses, (see Patent Reference No. 2), which is the need of observation from an approximately perpendicular direction from the surface of the optical device; therefore the present invention has the benefit of being suitable for observation from acute angles from the surface of the optical device.

Patent Reference No. 1: WO 2007/116639
Patent Reference No. 2: JP 2005-010755

SUMMARY OF THE INVENTION

Problems to be Solved by the Invention

Let us notice that the dihedral corner reflector array is constructed in such a way, that when the light, emitted from the object that is to be projected, passes through the optical device by being reflected once each from two specular surfaces of a corner reflector for a total of two reflections, an accurate real image of the above object will be formed. The most simple way of reducing unwanted light rays is by pointing all the above corner reflectors in one direction; in that case the image will be observable only from that direction. Because of this, the left-right angle of observation will be narrow, and it will be difficult for several persons to observe the same object simultaneously.

In light of the above, the purpose of the present invention is to provide a new optical device, which is still based on dihedral corner reflectors, but allows multiple persons from different directions to observe the floating image of the same object.

Means for Solving the Problems

That is to say, the present invention is a multiple-viewpoint floating imaging device provided with dihedral corner reflectors consisting of pairs of mutually perpendicular specular surfaces. A plurality of the above-mentioned dihedral corner reflectors form a single plane that passes light through it, thus forming an optical device. A plurality of the above-mentioned optical devices are rotated around a common axis of rotation that is perpendicular to the aforementioned single plane, and by passing light, emitted from an object to be projected that is placed to one side of the above plane, through the above plane by reflecting it once each from pairs of mirrors comprising dihedral corner reflectors, a real image is formed on the other side of the above plane that is observable from multiple directions. This kind of observation from multiple directions is first made possible by applying dihedral corner reflector arrays that allow observation from acute angles relative to their surface.

When an optical device with the above construction is used, the light emitted from the object to be projected shall be reflected once from each of the two mirrors comprising a dihedral corner reflector, while passing through the plane of the optical device. Thus the observer will be able to observe the image of the above object, when it is formed by the reflection on those dihedral corner reflectors which have their inner corner formed by their two mirrors in the line of sight of the observer, pointed toward the observer. Therefore, since there will be multiple dihedral corner reflectors placed in multiple directions along the plane of the optical device, it will be possible to observe the image of the object to be projected from multiple directions relative to the surface of the optical device. Furthermore, by the use of the above method of imaging by dihedral corner reflectors, it will be possible to achieve a wide range of focusing along the depth direction, that in turn enables the sharing of virtual 3-dimensional or 2-dimensional images from several directions, thus allowing the real image of the object to be projected to be virtually touched and manipulated simultaneously from several direction, and therefore making possible a heretofore unavailable usage of images. The mutually perpendicular mirrors that are the components of the dihedral corner reflectors might touch each other and share their rear parts, or alternately they might be standing apart from each other with some distance between them. Furthermore, the object to be projected might be a single object, or there might be several objects. In case the object to be projected is a single one, as it was explained above, the real image of it will be available for observation from multiple directions; if for example there are several liquid crystal displays arranged to be projected, their images will be available for observation simultaneously from multiple direction.

In particular, when we randomize the directions that the dihedral corner reflectors along the plane of the above mentioned optical device are facing, the structure of the optical device will be uniform, thus it will have no specific center, and image formation will be possible at any point and in any direction; furthermore, an additional benefit will be that there will be an increase in the freedom in the placement of the object to be projected, with respect to the surface of the optical device. However, since there will be dihedral corner reflectors that are not used for reflecting the light that is emitted from the object to be projected, the efficiency of light transmission through the optical device will be reduced. Furthermore, since there are specular surfaces that are facing in the direction of observation, it is possible that there will be stray light reflected once from them; but since the direction of the specular surfaces constituting the dihedral corner reflectors is randomized, the stray light due to single reflection will not form images.

As a further example, when all of the above-mentioned dihedral corner reflectors are arranged so that they face towards the same point, by positioning the object to be projected in the vicinity of the line going through that point perpendicularly to the plane of the optical device, it will become possible to share the real image projected to the other side of the optical device from multiple points of view.

In addition to the above examples, it is possible to construct a multiple-view-point floating imaging device that allows observation of the floating real image from multiple directions, by creating multiple regions in the above-mentioned optical device, with the above-mentioned dihedral corner reflectors facing in the same direction within a particular region, and with those directions of the dihedral corner reflectors being different according to the regions.

In that case, the above-mentioned multiple regions can be arranged in such a way that they will subdivide the surface of the above-mentioned optical device according to the angle measured from a particular position. By this arrangement, the real image of the object to be projected appearing on the opposite side of the optical device will be observable from multiple directions. The reason is that taking the particular position as the origin, there will be multiple regions with the above-mentioned dihedral corner reflectors in them facing the origin, with those regions arranged along the surface of the optical device, so it will be possible to observe the real image from multiple directions, by changing the viewing angle towards the origin. In that arrangement, the dihedral corner reflectors used to observe the image from a particular position will be densely spaced, thus resulting in a high rate of transmission. However, the structure of the optical device will no longer be uniform, as there will be a definite center, thus there will be restrictions on the positions where image can be formed. This effect is common to all of the multiple-view-point floating imaging devices disclosed in the present invention, with the exception of the multiple-view-point floating imaging device formed by randomized placement of dihedral corner reflectors along the plane of the optical device.

A further realization is possible by constructing multiple independent dihedral corner reflector arrays, with the dihedral corner reflectors in each of them facing in the same directions. In that case, multiple component optical devices consisting of dihedral corner reflector arrays are constructed, with each above-mentioned dihedral corner reflector array constructed by arranging dihedral corner reflectors consisting of pairs of mutually perpendicular specular surfaces along the potentially light transmitting plane of the component optical device, with each of the above-mentioned dihedral corner reflector facing in the same direction. By letting the light, emitted by the object to be projected that is placed to one side of the component optical devices, to cross the plane of the component optical device by being reflected once by each of the two mirrors comprising the dihedral corner reflector, a planar symmetric real image of the object to be projected will be formed at the other side of the component optical device; thus the optical device will be created as the set of the component optical devices consisting of the above-mentioned dihedral corner reflector arrays. Each of the above-mentioned dihedral corner reflector arrays are constructed from mutually perpendicular pairs of mirrors, arranged facing in the same direction along the potentially light transmitting plane of the component optical device in such a way that that the light emitted from the object to be projected, placed to one side of the above-mentioned component optical device, will be reflected once each from the two specular surfaces of each of the above-mentioned dihedral corner reflectors and pass through the potentially light transmitting plane of the above-mentioned component optical device, thus forming a planar symmetric real image of the object to be projected on the other side of the above-mentioned component optical device. In other words, the plane of the above-mentioned optical device will be formed as the set of component optical devices consisting of dihedral corner reflector arrays. In that case, compared with the case of constructing a single optical device by arranging multiple dihedral corner reflectors facing in different directions along the plane of that single optical device, manufacturing multiple dihedral corner reflector arrays consisting of multiple dihedral corner reflectors all facing in the same direction will be easier, therefore realizing the multiple-view-point floating imaging device of the present invention by combining multiple dihedral corner reflector arrays along multiple planes will result in lower costs.

In the case of the above-mentioned multiple-view-point floating imaging device of the present invention, constructed by placing dihedral corner reflectors facing in multiple directions in the close vicinity of the object to be projected, we have to consider the possibility of unwanted stray lights. Because of this, one way of reducing unwanted stray lights and achieving clear images is achieved by constructing the multiple-view-point floating imaging device in such a way, that none of the above-mentioned dihedral corner reflectors are placed in the region around the line perpendicular to the above-mentioned optical device and passing through the object to be projected. The region, where no dihedral corner reflectors are placed in order to reduce unwanted stray lights might be made opaque, or might be shaded.

As a concrete realization of dihedral corner reflectors, a planar shaped substrate might be penetrated by perpendicular holes, with their inner surfaces forming the above-mentioned pairs of mutually perpendicular mirrors, so that the light crossing from one side of the substrate to its other side through the above-mentioned holes will be reflected once from each of the above-mentioned two mirrors, thus achieving a preferable realization of the invention. In that case, the plane that is perpendicular to the plane of both of the mirrors, for example, for the case of the substrate being a thin straight substrate, the central plane passing through half of the thickness of the substrate perpendicularly to the two specular planes (usually a plane parallel to the surface of the substrate) will be the plane of the optical device comprising the multiple-view-point floating imaging device.

As another realization, it is possible to create dihedral corner reflectors by placing the above-mentioned pairs of mutually perpendicular mirrors along the internal surface of a transparent tube, in such a way that when light passes from one surface perpendicular to both of the above-mentioned mirrors to the other surface, it will be reflected once each from one of the above-mentioned pair of mutually perpendicular mirrors, thus achieving a result equivalent to the case when the internal surfaces of holes are used. In this case also the plane that is perpendicular to the planes of two mutually perpendicular mirrors, for instance in the case that the external shape of the tubular device is a cube, the plane crossing it along the center of its height perpendicularly to both mirrors, will be the optical device plane of the multiple-view-point floating imaging device.

Furthermore, by making those inner surfaces of the above-mentioned holes, or of the above-mentioned tubes, that do not belong to dihedral corner reflectors, non-reflecting, it is possible to prevent multiple reflections, that is, light to be reflected three or more times.

Furthermore, by making those inner surfaces of the above-mentioned holes, or of the above-mentioned tubes, that do not belong to dihedral corner reflectors, non-perpendicular to the optical device plane, it is also possible to prevent multiple reflections.

When the real image of the object to be projected is observed by the multiple-view-point floating imaging device of the present invention, the image is formed by the light passing obliquely through the plane of multiple dihedral corner reflectors behind the real image; however, when those planes of multiple dihedral corner reflectors are observed from the opposite direction, it might be possible to observe directly the object to be projected as it is below the optical device plane. Because of this, it is possible to create a measure for preventing the unwanted stray lights, by arranging a visibility control device along the optical device plane that passes, blocks, or disperses light passing along specific rays, thus by the above-mentioned light guiding device only the light rays contributing to the image formation will be allowed to pass, while other light rays that would contribute to the unwanted stray light will be blocked. With such a measure, it will become possible for the observer to avoid seeing the object to be projected directly underneath the optical device plane, instead seeing only the floating image due to the real image. The optical visibility control device might be placed either to the side of the optical device where the real image is formed, or equally to the other side where the object to be projected is placed. As concrete examples of the visibility control device, the visibility control film 'Lumisty' (a product of Sumitomo Chemical Co., Ltd., Japan) that disperses light coming from specific directions, or visibility control films that block light rays in specific directions only by microscopic louvers (for example, 'Light Control Film' (a product of Sumitomo 3M Co., Ltd.)) or other similar optical films or other measures might be used. Furthermore, it is possible to extend the method of using microlouvers by arranging shading plates not only in parallel planes, but in a lattice pattern.

Effects Achieved by the Invention

According to the present invention, multiple dihedral corner reflectors arranged in appropriate directions are placed along the optical device plane; or multiple component optical devices formed by dihedral corner reflector arrays, consisting of a multitude of dihedral corner reflectors arranged in the same directions, are placed facing in several directions along the optical device plane; thus making it possible to observe from multiple directions the image of the object to be projected that is placed to one side of the optical device plane, in the other side of the optical device plane. The image that is observed in this manner will be formed floating in the air, irrespective of whether the object to be projected is a two-dimensional or three-dimensional object or an image, and will be available for the observer to access virtually. For example, when the multiple viewing-point floating imaging device of the present invention is of such a construction that the image appearing on the opposite side of the optical device plane from the object to be projected is observable from all directions (in 360 degrees), in case the object to be projected is planar, it will appear floating in the same position when observed from any direction; or when the object is a solid object, its image will be observed with the depth direction reversed. Furthermore, by embedding the multiple-viewpoint floating imaging device of the present invention with the above-mentioned construction into the top surface of a table or other objects, with the object to be projected being placed under the top surface, the image of the object to be projected will be observable simultaneously from multiple directions (by multiple observers), thus making it possible to create a new kind of display device.

DETAILED DESCRIPTION OF THE INVENTION

Hereinafter, preferred embodiments of the present invention are described below with reference to the drawings.

First Embodiment

Figure 1:
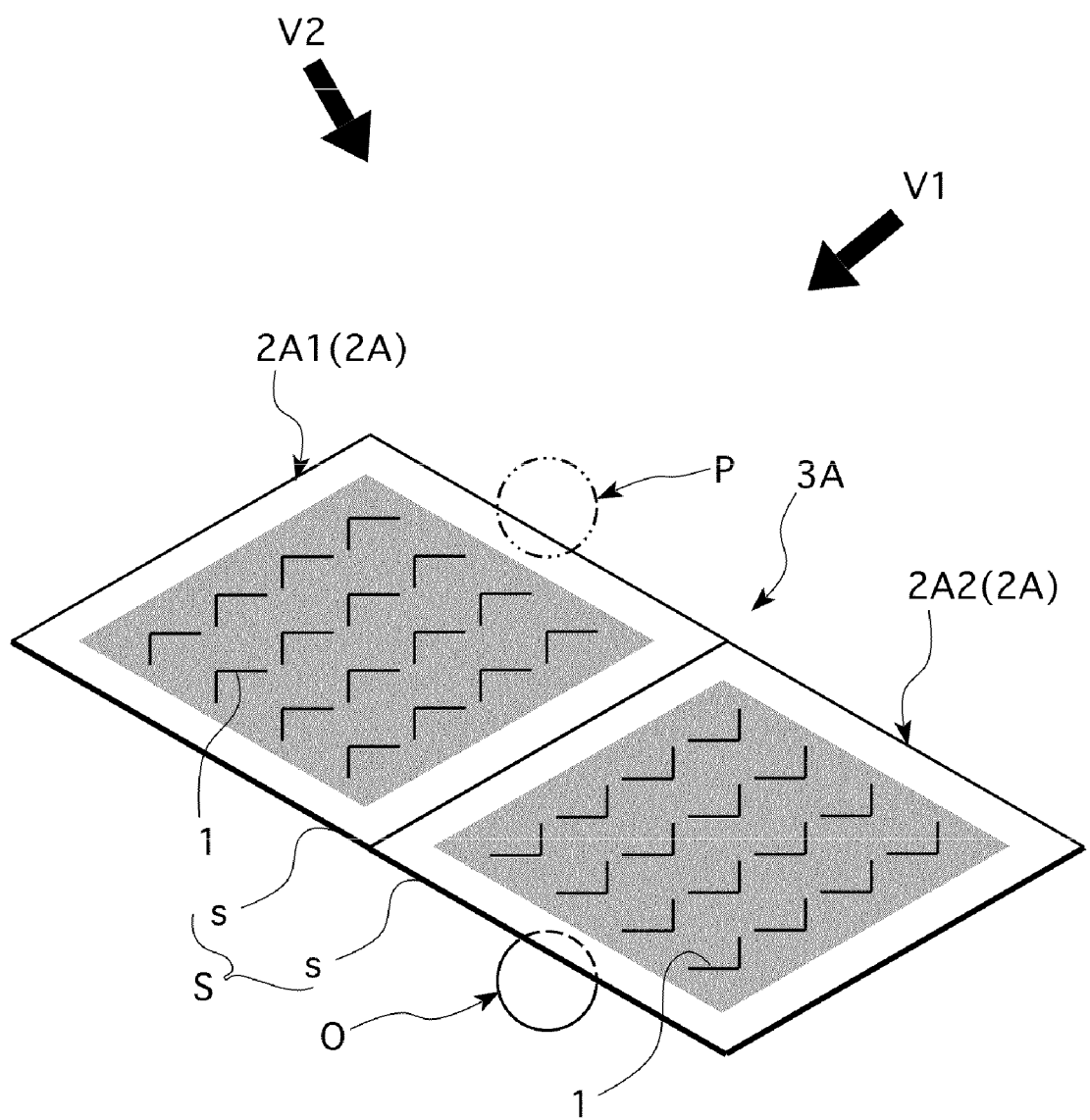
FIG. 1 is a perspective outline drawing of one realization of the multiple viewing-point floating imaging device of the first embodiment of the present invention.

The first embodiment of the present invention as shown in FIG. 1 is an example of a multiple-view-point floating imaging device 3A consisting of two dihedral corner reflector arrays 2A1 and 2A2, each having multiple dihedral corner reflectors 1. The present embodiment of a multiple-view-point floating imaging device 3A consists of a pair of dihedral corner reflector arrays 2A1 and 2A2 placed facing each other, where with the object to be projected O being placed on one side (in the example shown in the Fig., the lower side) of the part of the optical device plane S that is located between the pair of dihedral corner reflector arrays 2A1 and 2A2, from the viewing point V1 the image P of the object to be projected O is visible through the dihedral corner reflector array 2A1, and from the viewing point V2 it is visible through the dihedral corner reflector array 2A2. Note, however, that the multiple viewing-point floating imaging device S is constructed from the dihedral corner reflector arrays 2A1 and 2A2, as its component optical device planes s. Since the dihedral corner reflector 1 is of minuscule dimensions as compared with the dihedral corner reflector arrays 2A1 and 2A2, in the Fig. the whole set of the dihedral corner reflectors 1 is indicated by gray shading, and the direction of its internal angle is indicated by a V mark. In the following, we explain the actual structure of each component, and the forming of the image. When we refer to the set of the two dihedral corner reflector arrays 2A1 and 2A2 jointly, we will use the notation 2A.

Figure 2:
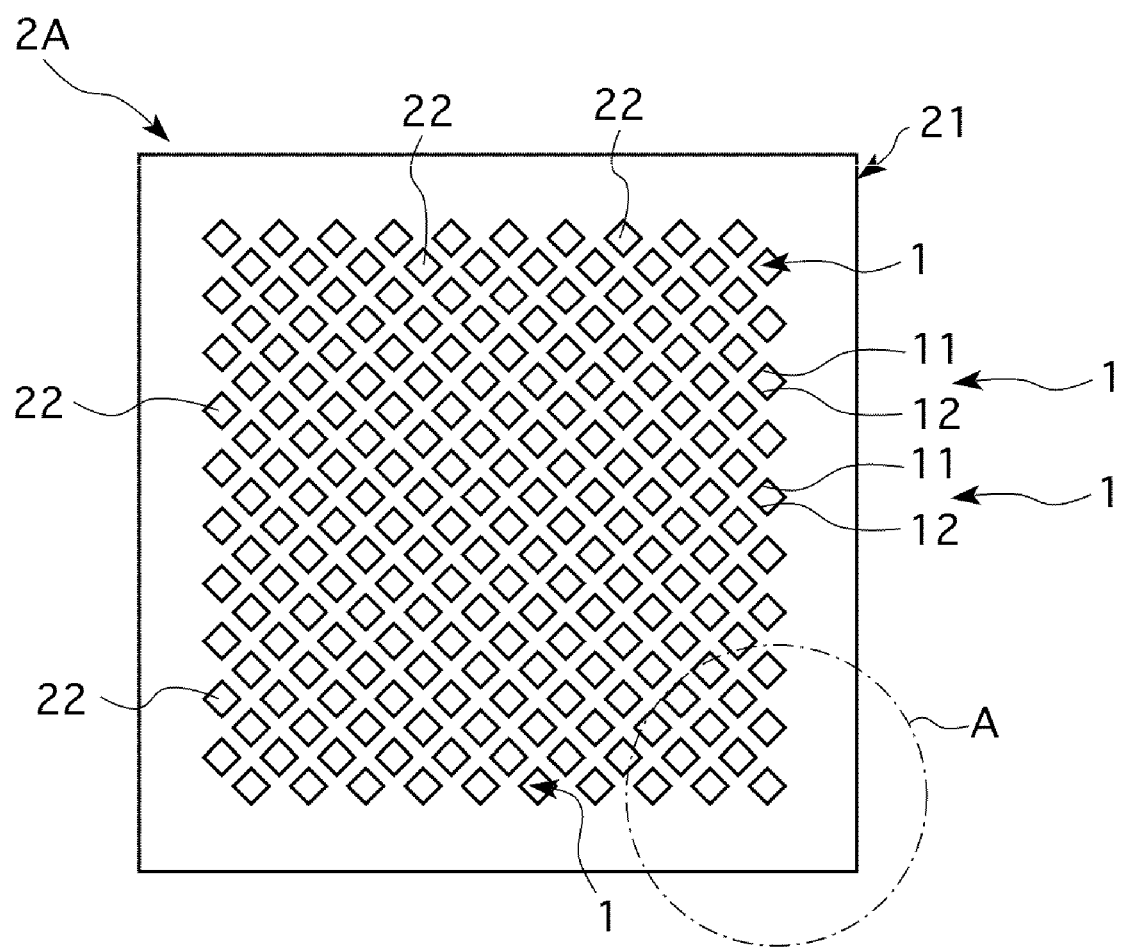
FIG. 2 is a plane drawing of the dihedral corner reflector array used for the above-mentioned of the first embodiment of the present invention.

Each dihedral corner reflector array 2A, as shown in FIG. 2, consists of a planar substrate 21, where the substrate 21 is penetrated perpendicularly to its surface in the direction of its thickness by multiple holes 22, and in order to use each hole 22 as a dihedral corner reflector 1, each hole 22 has two mutually perpendicular internal surfaces 11 and 12 prepared as specular surfaces.

Figure 3:
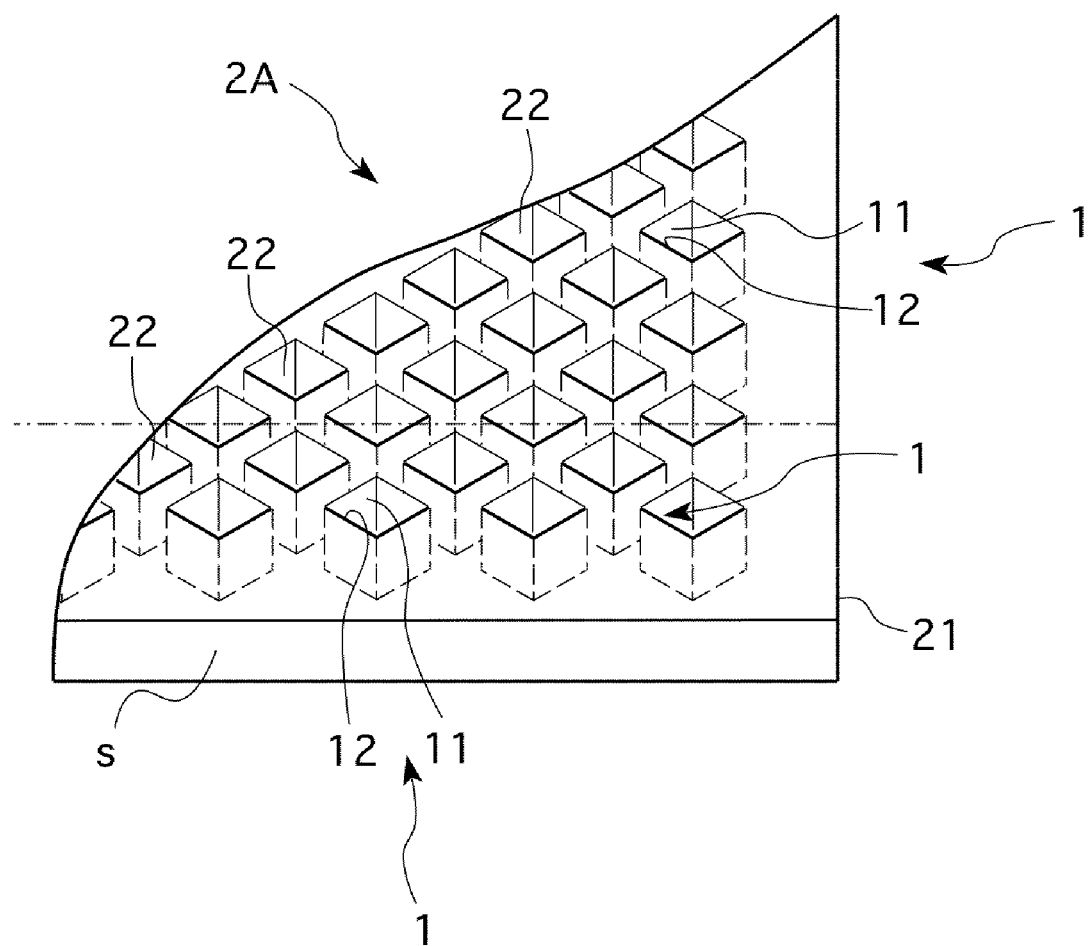
FIG. 3 is a perspective drawing of the enlargement of a part of the above-mentioned dihedral corner reflector array.

The substrate 21 might have a thickness with dimensions between 50 to 200 micrometers, and while in the present embodiment we shall use a substrate thickness of 100 micrometer and a square substrate shape with both sides of 5 cm length, there is no need to restrict the thickness and linear dimensions of substrate 21 to these dimensions, but they can be designed as desired. As shown in FIG. 3 by enlarging region A of FIG. 2, each dihedral corner reflector 1 is a physical and optical hole through substrate 21 to pass light through it. In the embodiment, first we manufacture a multitude of holes 22' with rectangular cross sections (more concretely, in the present embodiment, square cross section), and process two adjacent, mutually perpendicular surfaces of each hole 22 into smooth planar specular surfaces 11 and 12, which mirrors 11 and 12 will thus form, as the reflecting surfaces, the dihedral corner reflector 1. In addition, those remaining two surfaces of the hole 21 that are not being used to form the dihedral corner reflector 1 shall not be processed into specular surfaces, instead it is desirable that they are treated to form non-reflecting surfaces, or alternately their angle is modified from perpendicular, in order to prevent multiple reflections. Each dihedral corner reflector 1 is manufactured in such a way, that the internal angle formed by the specular surfaces 11 and 12 along the substrate 21 will be all pointing in the same direction. In the following, we shall refer to the direction of the above-mentioned internal angle formed by the specular surfaces 11 and 12 as the orientation (direction) of the dihedral corner reflector 1. With respect to the manufacturing of the specular surfaces 11 and 12, in the present embodiment first we create a metal mold, with the internal walls that comprise the specular surfaces 11 and 12 being manufactured by nano-machining into specular finish, where the surface roughness is below 10 nm, in order to achieve uniform mirroring capability across the whole visible spectrum.

In concrete terms, for the present embodiment each mirror element 11, 12 that comprises the dihedral corner reflector 1 might have a side length of 50 to 200 micrometer, with this length in the present embodiment being 100 micrometer; where first a mold is created by the above-mentioned nano-machining method, and using that mold with nano-scale pressing technology, for instance with nano-imprint technique or electro-forming technique, a multitude of the above-mentioned dihedral corner reflectors 1 are formed in each substrate 21. In the present embodiment, the sides of each dihedral corner reflector 1 that form a V shape along the component optical device plane s are pointed at 45 degrees toward the side or length direction of the substrate 21, and each dihedral corner reflector 1 is arranged along the points of some regular lattice along the optical device plane S, all pointing in the same direction. By reducing the distance between neighboring dihedral corner reflectors 1 as far as possible, the transmittance can be improved. Furthermore, those parts of the above-mentioned substrate 21 that are not components of dihedral corner reflectors 1 are processed to be opaque, and the upper and lower surfaces of substrate 21 are covered with thin transparent protective sheets (not shown in the Figures). In the present embodiment, we use dihedral corner reflector arrays 2A that have several tens or hundreds of thousands of the above-mentioned dihedral corner reflectors 1 for each substrate 21.

As another manufacturing method, when substrate 21 is formed from aluminum or nickel by electroforming, the specular surfaces 11 and 21 shall be naturally specular surfaces, assuming that the surface smoothness of the mold is sufficiently good. When the nano-imprinting method is used and substrate 21 is made from resin, in order to form the specular surfaces 11 and 12, it is necessary to equip it with a specular coating, by sputtering or similar methods.

When the dihedral corner reflector 1 is thus formed in substrate 21, it shall have the property that light entering hole 22 from the top (or bottom) surface of substrate 21 shall be reflected once from one of the mirrors (11 or 12), then reflected again from the other mirror (12 or 11), thus transmitting it to the bottom (or top) surface; so when the light path is viewed from the side, the entering light path and the exiting light path shall be planar symmetric with respect to the plane of the substrate 21 between them; therefore when the above-mentioned substrate 21 has a multitude of dihedral corner reflectors 1 arranged along it, it will function as a dihedral corner reflector array 2A. Therefore, the component optical device plane s (assuming a plane along the half thickness of substrate 21, perpendicular to each mirror element, shown in the Figure by imaginary line) of the above-mentioned dihedral corner reflector array 2A shall be a plane that forms the real image of the object to be projected, placed on one of its sides, on its other side.

Figure 5:
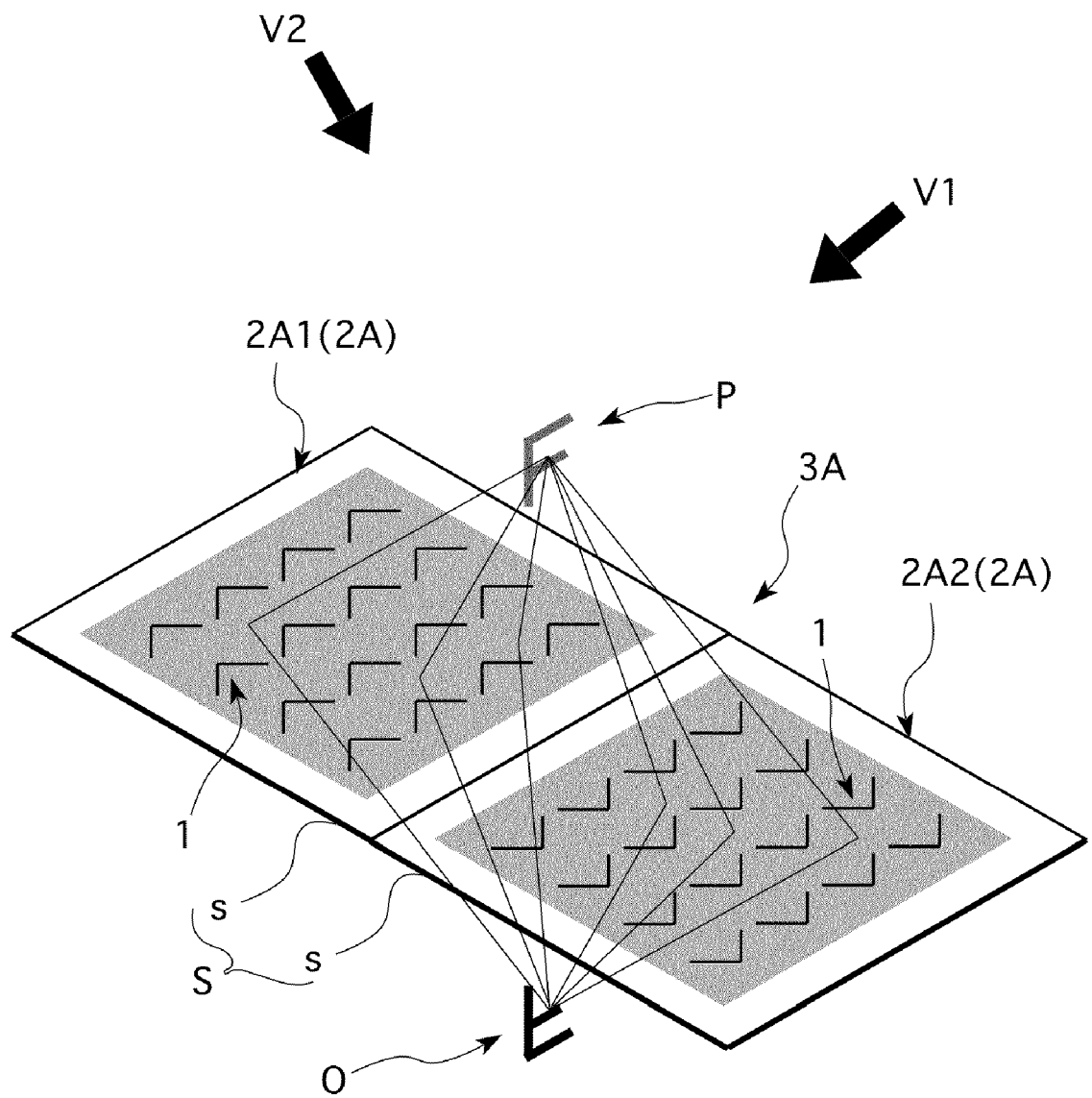
FIG. 5 is a perspective drawing showing schematically the process of floating image formation for the multiple-view-point floating imaging device of the above first embodiment of the present invention.

The multiple-view-point floating imaging device 3A consists of two of the above-mentioned dihedral corner reflector arrays 2A (denoted by 2A1 and 2A2), with their dihedral corner reflectors 1 pointing in mutually opposite directions, and with their edges connected together in order to have their component optical device planes s form a common optical device plane S. Furthermore, the object to be projected shall be placed along the joint part of the two dihedral corner reflector arrays 2A1 and 2A2, to the center of one side of the optical device plane S (below substrate 21). The object to be projected might be a two-dimensional object (to be precise, not exactly two-dimensional but still some very thin object like letters or drawings on paper), a three-dimensional object, a video, or other objects. In the present embodiment, as a concrete example of an object to be projected O, in FIG. 5 we employ the alphabetic letter F as a two-dimensional object. However, in order to have the letter F pointing upward in the observable real image, it is placed upside down in the object to be projected O.

Figure 4:
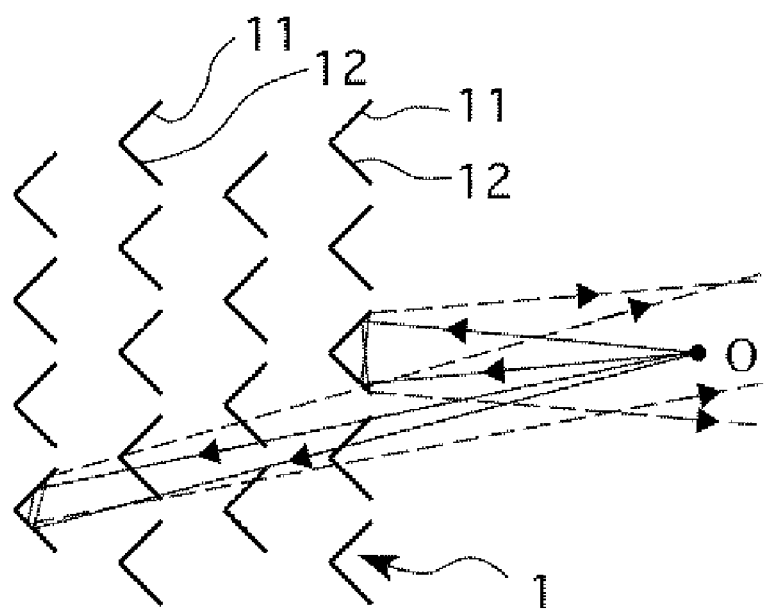
FIG. 4 is a plane drawing showing schematically the process of floating image formation for the multiple-view-point floating imaging device of the above first embodiment of the present invention.

We shall explain the image formation according to the present embodiment of the multiple-view-point floating imaging device 3A, together with the light path of the light emitted from the object to be projected O. As shown in the plane drawing in FIG. 4, the light emitted from the object to be projected O (in the direction of the arrows, solid lines; in 3 dimensions, progressing from behind the drawing towards the viewer) as it passes through one of the holes 22 in the substrate 21 of the dihedral corner reflector array 2A, it will be reflected by one of the mirrors 11 (or 12) comprising the dihedral corner reflector 1, then again reflected by the other mirror 12 (or 11) (after passing through the hole, the light ray is shown by dotted line), so that the image of the letter F will be formed in a planar symmetric position from the object to be projected O with respect to the component optical device plane s of the dihedral corner reflector array 2A. The light that is reflected once each from the mirror elements 11 and 12, as shown in FIG. 4, appears not pass through the position of the object to be projected O, this is due to the over-emphasised size of the dihedral corner reflector 1, and in reality, compared with the distance from the object to be projected O, the size of the dihedral corner reflector 1 is so diminutive that the spread of the reflected light at the point of image formation is similarly very small. In concrete terms, the spread is on the order of twice the size of the dihedral corner reflector 1. This real image P is, as shown schematically in FIG. 5, visible when observing it from a position where the above-mentioned mirrors 11, 12, belonging to the dihedral corner reflector array 2A; that is, from above the substrate 21 of the other dihedral corner reflector array 2A. For the light passing through and being reflected by the other dihedral corner reflector array 2A, forming an image of the object to be projected O, the process is similar, but as this dihedral corner reflector array 2A forms the image of the reverse side of the letter F that is the object to be projected O, the image of the letter F will be observable in a back-to-front reversed state. In more details, as the light is reflected twice by the mirror elements 11 and 12, the light components that are parallel to the substrate 21 (in other words, the components that are parallel to the optical device plane S) will return to their origin, while the components that are parallel to the plane of the mirror elements 11 and 12 (in other words, those that are perpendicular to the optical device plane S) will be preserved as they are. The result is that the light that passes through each dihedral corner reflector array 2A by two reflections, will always pass through a plane symmetric location with respect to the optical device plane S. Therefore, since light is being emitted in multiple directions from the object to be projected O, as those light rays pass through the dihedral corner reflector arrays 2A by being reflected twice on the dihedral corner reflector 1, all the light will converge in the same point. In this way, as the light passing through the dihedral corner reflector array 2A by two reflection converges to a plane symmetric position, convergence is possible for a wide range in the depth direction (that is, in the direction perpendicular to the optical device plane S). Thus when a three-dimensional object is placed, as the object to be projected O, in the space under the lower surface of substrate 21, a three-dimensional image will appear over the upper surface of substrate 21. However, the convex and concave features of that three-dimensional image will be reversed. We will discuss the observation in the case when the object to be projected O is a three-dimensional object, referring to FIG. 13.

Second Embodiment

Figure 6:
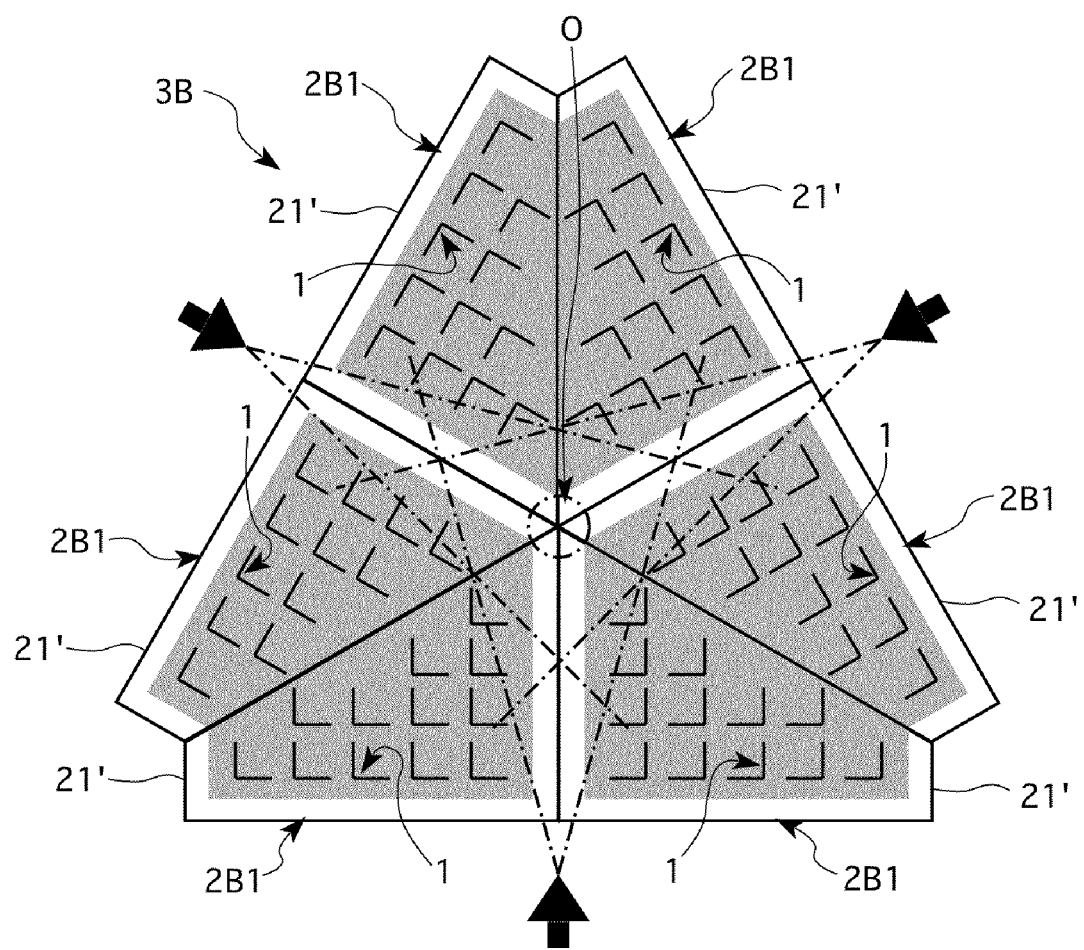
FIG. 6 is a plane outline drawing of the multiple viewing-point floating imaging device of the second embodiment of the present invention.

The second embodiment of the present invention as shown in a schematic plane drawing in FIG. 6, is a multiple-view-point floating imaging device 3B that is suitable for observation of the image of the object to be projected O, from at least 3 different directions. Note that in the case of the dihedral corner reflectors 1, the set of all of them is denoted by gray shading, and their internal angle is denoted in an exaggerated manner by a letter V. (In the Figures following FIG. 6, we use the same notation.)

Figure 7:
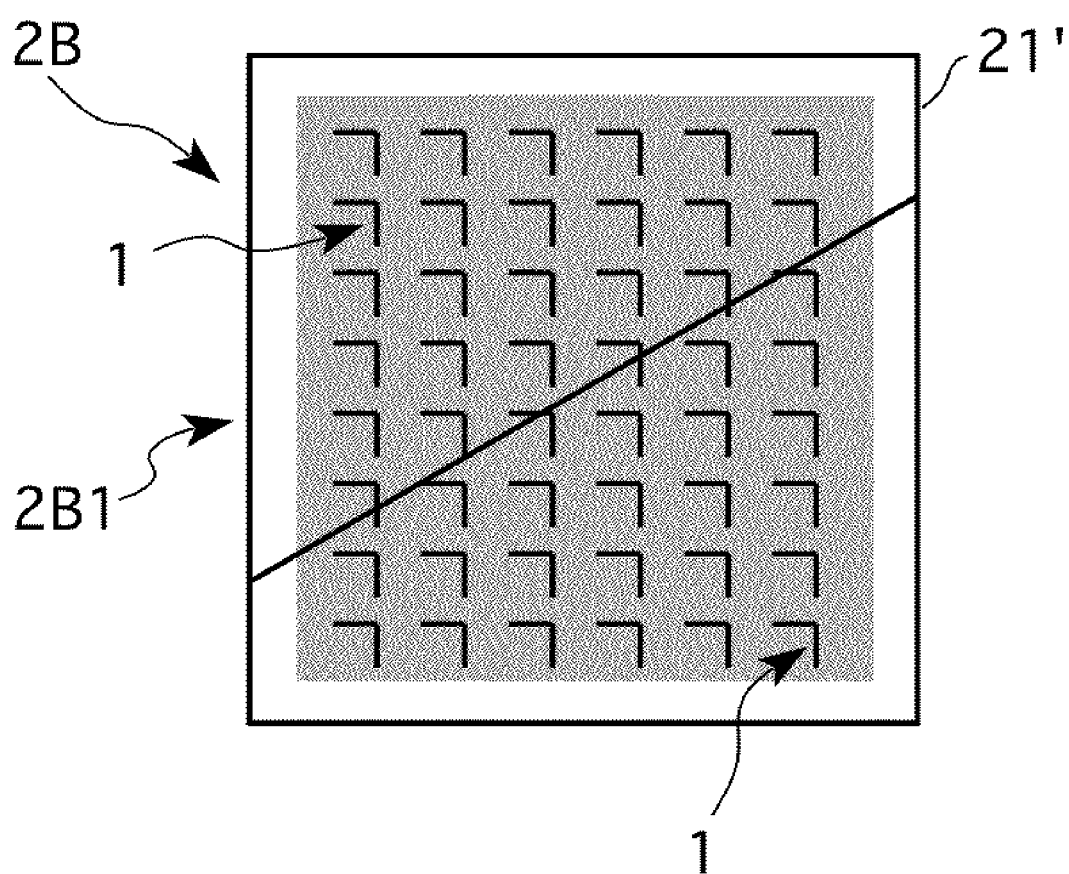
FIG. 7 is a plane drawing of the dihedral corner reflector array used for the above-mentioned of the second embodiment of the present invention.

The multiple-view-point floating imaging device 3B according to the current embodiment can be constructed for example by cutting into half 6 of the dihedral corner reflector arrays 2B described in the First Embodiment, and re-attaching one half of each with appropriate directions. In concrete terms, each dihedral corner reflector array 2B is similar to the dihedral corner reflector arrays 2A used in the First Embodiment, but the direction of the dihedral corner reflectors 1 is tilted by 45 degrees in the optical device plane S, and as shown in FIG. 7, it is cut into two along a straight line going across its center, where the above-mentioned line forms a 60 degree angle with the sides; thus the dihedral corner reflector array 2B is split into two trapezoidal shapes, of which one (in the Figure, the upper left one) is used as the dihedral corner reflector 2B1. Thus among the 6 trapezoidal dihedral corner reflector arrays 2B, 3 are turned over, with turned over ones and straight ones facing each other, attached along the long side of the trapezoid, by which we arrive at the multiple-view-point floating imaging device 3B shown in FIG. 6. It goes without saying that such a multiple-view-point floating imaging device 3B can alternatively created not only by cutting up square dihedral corner reflector arrays 2B, but also by manufacturing directly 6 pieces of dihedral corner reflector arrays that have the same shape like the dihedral corner reflector array 2B1. It should be mentioned that if we take care not to damage the dihedral corner reflectors along the boundary between two image forming devices belonging to the same observing direction, by forming a staggered boundary line, it becomes possible to avoid having a discontinuity in the image forming along the boundary line.

With the multiple-view-point floating imaging device 3B obtained by the above method, the 6 trapezoidal dihedral corner reflector arrays 2B1 form a shape with the angle between the long side and the tilted side of the trapezoids being in its center, so when the object to be projected O is placed to one side (the side under the page) of the central base plate 21', it will be possible to observe the image of the object to be projected O from the other side (the side above the page). Thus, as shown in FIG. 6, for the two dihedral corner reflector arrays 2B1 that are connected by the tilted side of the trapezoidal shape, the dihedral corner reflectors 1 are facing in nearly the same direction toward the object to be projected O, therefore when observed from the direction of extending the tilted side of the trapezoid across the center of the multiple-view-point floating imaging device 3B (in the above-mentioned Figure, the direction of the gaze is indicated by an arrow), the image of the object to be projected O, formed by the two dihedral corner reflector arrays 2B1, becomes observable. Furthermore, as there are 3 sets of such combinations of dihedral corner reflector arrays 2B1 in the multiple-view-point floating imaging device 3B of the current embodiment, observation of the image is possible from at least 3 directions; in addition, when observing from the directions directly opposite from the dihedral corner reflectors 1 in each of the six dihedral corner reflector array1 2B1, the present multiple viewing-point floating imaging device 3B will allow six additional directions to observe the image. It should be noted that the dihedral corner reflectors 1 of the two dihedral corner reflector arrays 2B1 facing in approximately in the same direction, are strictly speaking not really facing in exactly the same direction, but are at 15 degrees inclination with respect to the direction of the gaze; however, that much difference in direction is within the range of the difference in binocular viewing direction between the eyes of the observer, thus they might be deemed sufficiently close in direction.

As there is a high possibility that in the central part 21' of the multiple-view-point floating imaging device 3B that is directly above the object to be projected O, if there would be several dihedral corner reflectors 1 pointing into different directions, unwanted stray lighting might occur and prevent the forming of clear images, it is advisable to omit the placing of dihedral corner reflectors 1, or otherwise prevent the transmission of light in those parts of the central plate 21' that overlap with the object to be projected O when viewed from above.

Third Embodiment

Figure 8:
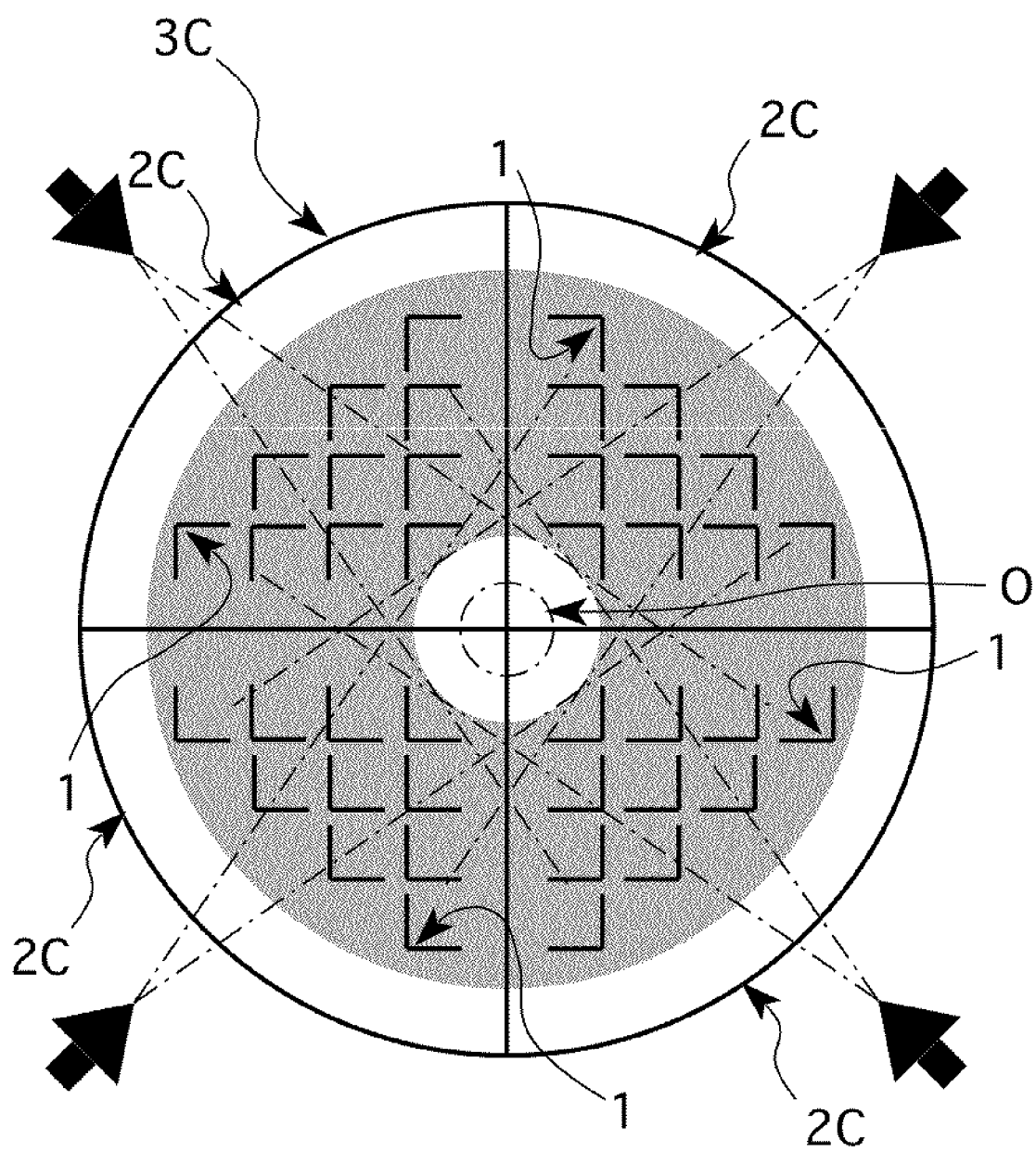
FIG. 8 is a plane outline drawing of the multiple viewing-point floating imaging device of the third embodiment of the present invention.

The third embodiment of the present invention as shown in the schematic plane drawing of FIG. 8, is a multiple-viewpoint floating imaging device 3C in the shape of a disc, that allows the observation of the object to be projected O from four directions. In concrete terms, the current multiple-viewpoint floating imaging device 3C consists of four planar sector-shaped dihedral corner reflector arrays 2C. Each dihedral corner reflector array 2C has a central angle of 90 degrees, and they are of identical shape and size, connected together to form a single disc. In these dihedral corner reflector arrays 2C, the dihedral corner reflectors 1 are constructed similarly to the case of the first embodiment, and the relation between the component optical device plane s and the optical device plane S is also similar to the case of the first embodiment; however, in the current embodiment, the internal angle of the dihedral corner reflectors 1 of the dihedral corner reflector arrays 2C face toward their central angle (their peak point), and similarly to the case of the second embodiment, in order to prevent the unwanted stray lights, dihedral corner reflectors 1 are omitted in the vicinity of the central angle.

The above-mentioned multiple viewing-point floating imaging device 3C has, with its center as the reference, regions at predetermined angular intervals (in the current example, at 90 degrees) in which regions the dihedral corner reflectors 1 are facing in the same direction, whereby each region is formed by dihedral corner reflector arrays 2C. Therefore by placing the object to be projected O to one side (under the page) of the above-mentioned central reference region, it will be possible to observe the image of the object to be projected O from the other (over the page) side. In other words, by viewing in the direction of one dihedral corner reflector array 2C on the opposite side of the central region (in the above-mentioned Figure, the direction of the gaze is shown by arrows), it will be possible to observe the image of the object to be projected O as formed by the above-mentioned dihedral corner reflector array 2C, for a total of 4 possible observing directions.

Figure 9:
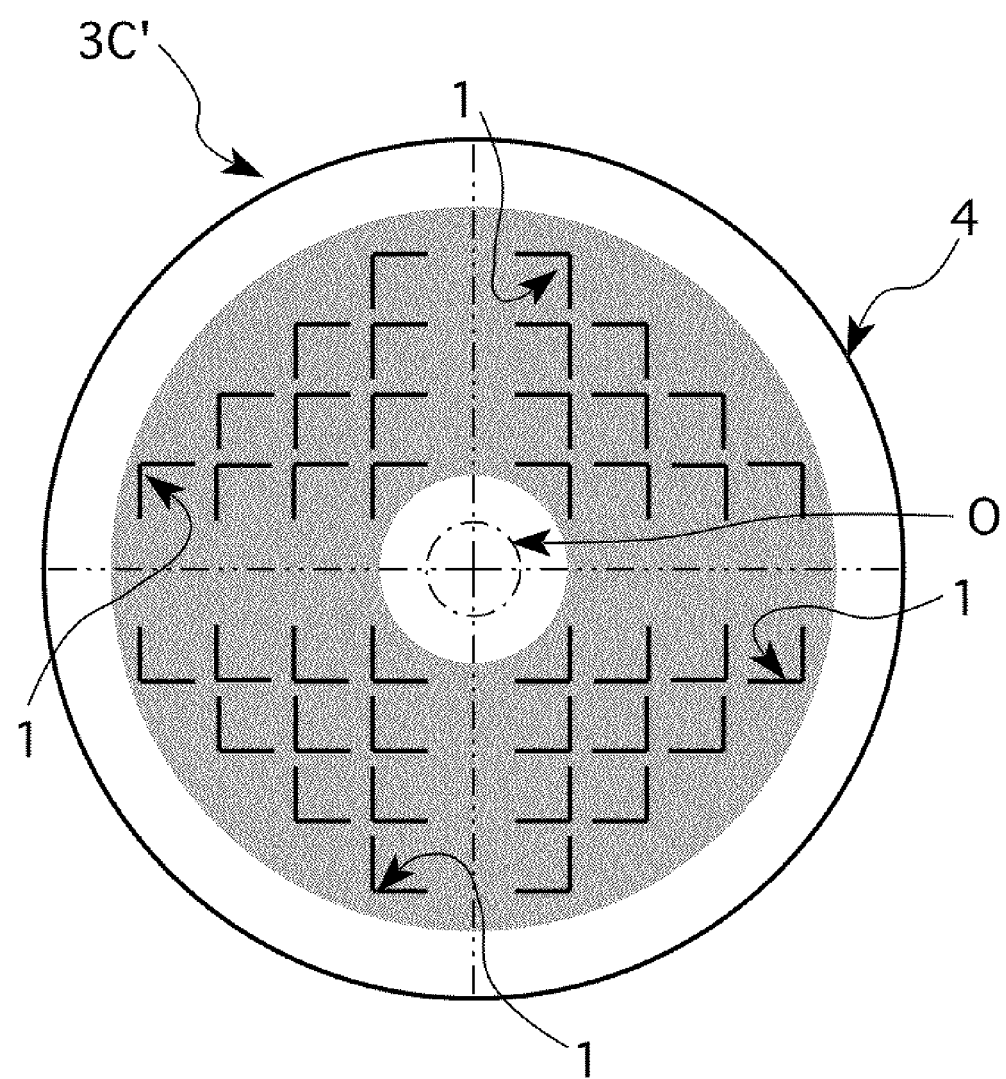
FIG. 9 is a plane drawing of another example of the above-mentioned multiple viewing-point floating imaging device of the third embodiment of the present invention.

As for the dihedral corner reflector arrays, their number and the central angle of their sector shape can be freely determined, and accordingly the number of the available observing directions of the object to be projected O is also freely selectable. In addition, such a multiple viewing-point floating imaging device 3C might be constructed not only by connecting multiple dihedral corner reflector arrays 2C into a single plane, but also, as shown as an alternative in FIG. 9, by constructing a single substrate 4 having an optical device plane, with regions at predetermined angles (in the above-mentioned Figure, at 90 degrees) around the center, with multiple dihedral corner reflectors 1 facing in the same direction within each region; thus achieving a multiple viewing-point floating imaging device 3C' having identical capabilities. Furthermore, instead of using four sector-shaped dihedral corner reflector arrays 2C as described above, it is also possible to use four dihedral corner reflector arrays 2C of some other, not sector-shaped form for instance of rectangular form, to construct a multiple viewing-point floating imaging device with similar capabilities to the current embodiment.

Fourth Embodiment

Figure 10:
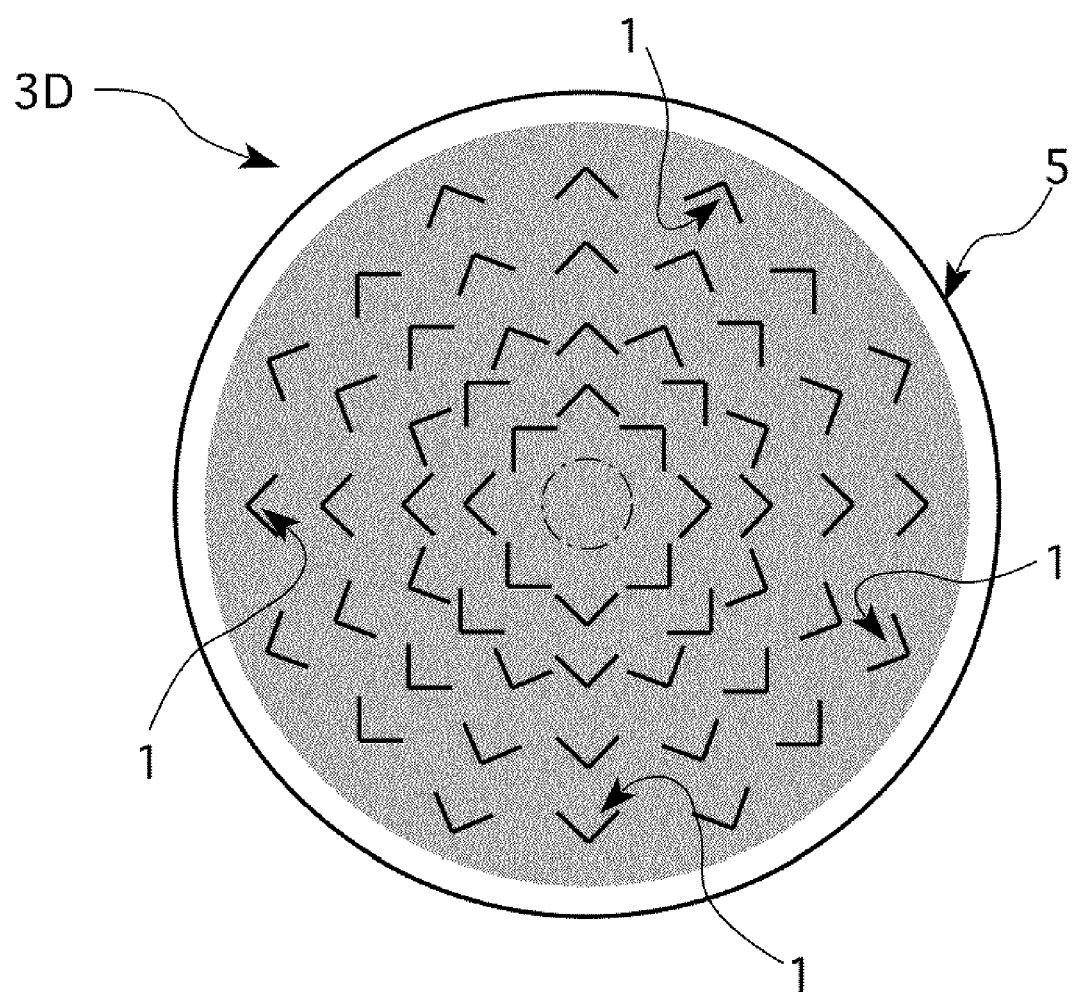
FIG. 10 is a plane outline drawing of the multiple viewing-point floating imaging device of the fourth embodiment of the present invention.

The fourth embodiment shown schematically in the plane drawing in FIG. 10 is, similarly to the third embodiment and to its alternative embodiment, a disc-shaped multiple viewing-point floating imaging device 3D, where all the dihedral corner reflectors 1 formed along the substrate 5 are arranged to face one specific point. In the current embodiment, as a specific example we show the case of all dihedral corner reflectors 1 facing the central point of the optical device plane S, but it is possible to select any point where the dihedral corner reflectors 1 will face, and also the multiple viewing-point floating imaging device 3D is not necessarily restricted to be disc-shaped.

In the case of the above-mentioned multiple viewing-point floating imaging device 3D, the object to be projected O is placed to one side (in the example of the Figure, to the bottom side) of the optical device plane S, on the line crossing perpendicularly the center point of the multiple viewing-point floating imaging device 3D. According to this, the real image of the object to be projected O shall be formed in the air on the other side of the optical device plane S along the above-mentioned perpendicular line, and the observer will be able to view it from an arbitrary direction from the other side (in the example of the Figure, the top side) of the optical device plane S.

Fifth Embodiment

Figure 11:
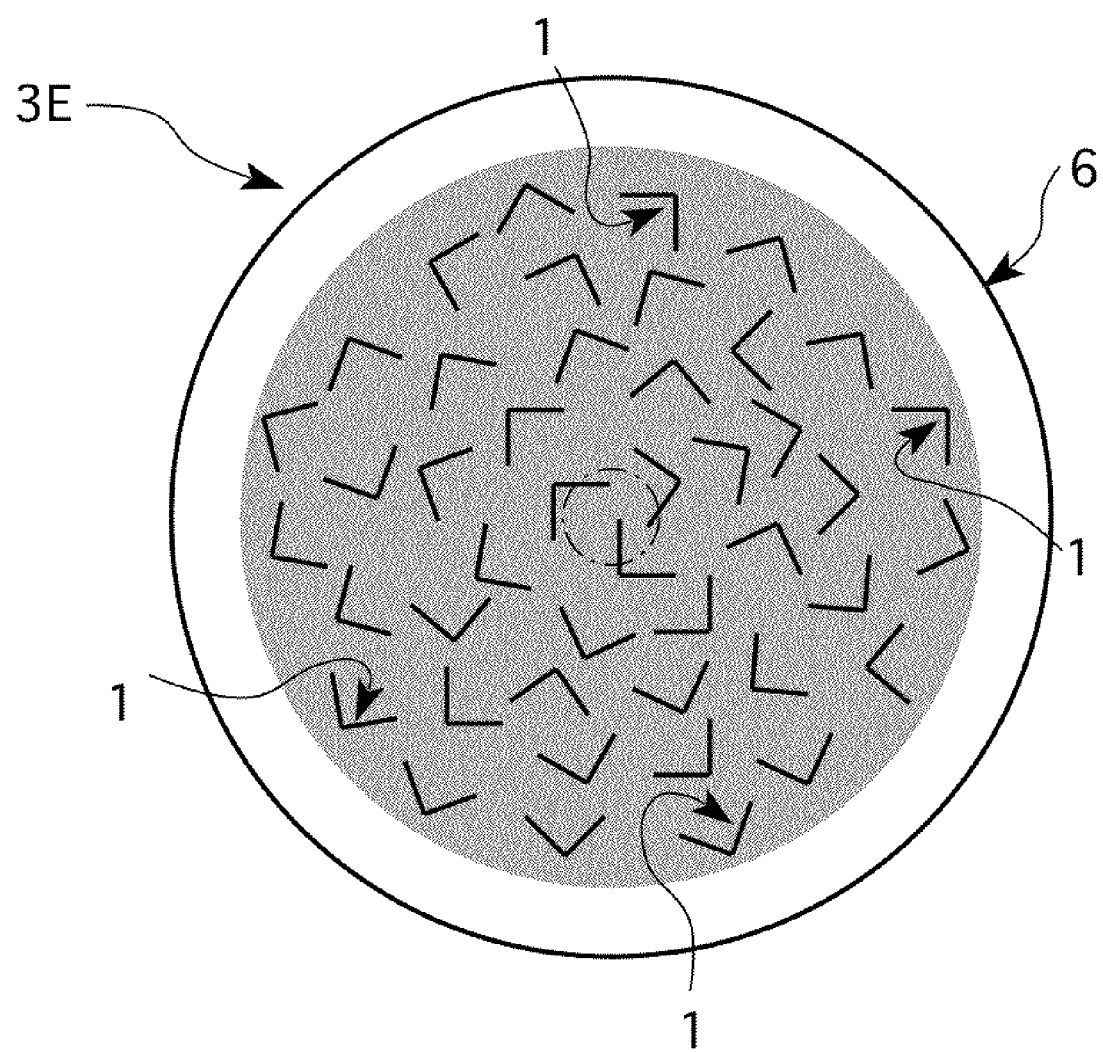
FIG. 11 is a plane outline drawing of the multiple viewing-point floating imaging device of the fifth embodiment of the present invention.

The fifth embodiment shown schematically in the plane drawing in FIG. 11 is a multiple viewing-point floating imaging device 3E, constructed by arranging a multitude of dihedral corner reflectors 1 facing in random directions, along the plane of a substrate 5 that is similar to the first embodiment. In case of the current multiple viewing-point floating imaging device 3E, the object to be projected O may be placed into any position along the bottom side of the substrate 6; in the current embodiment it is placed under the central part of the substrate 6. By making the directions, where a multitude of dihedral corner reflectors 1 are facing, random in this way, when this configuration is compared with the case where dihedral corner reflectors within a certain angular region are all facing in the same direction, it is found that the unwanted stray lights due to single reflection are dispersed, and furthermore the lateral angle of visibility of the doubly reflected light becomes wider, thus making the peak of the transmissivity with respect to the viewing angle less sharp. Thus when observing from a position above the substrate 6, the image of the object to be projected O will become visible due to those dihedral corner reflectors 1 that are facing approximately in the opposite direction to the observation direction. Therefore the image of the object to be projected O will be visible from all directions (in 360 degrees) with respect to the plane of the substrate. We note that in the above-mentioned case where the dihedral corner reflectors are arranged with random directions, for the imaging device structures shown in FIGS. 2 and 3, both for the case of hole-shaped or rectangular prism-shaped devices, it is advantageous to make all four side surfaces perpendicular and specular, thus forming four dihedral corner reflectors. In that case, although there will be a certain amount of multiple reflections, the intensity of the image will increase due to the four sets of dihedral corner reflectors.

Figure 12:
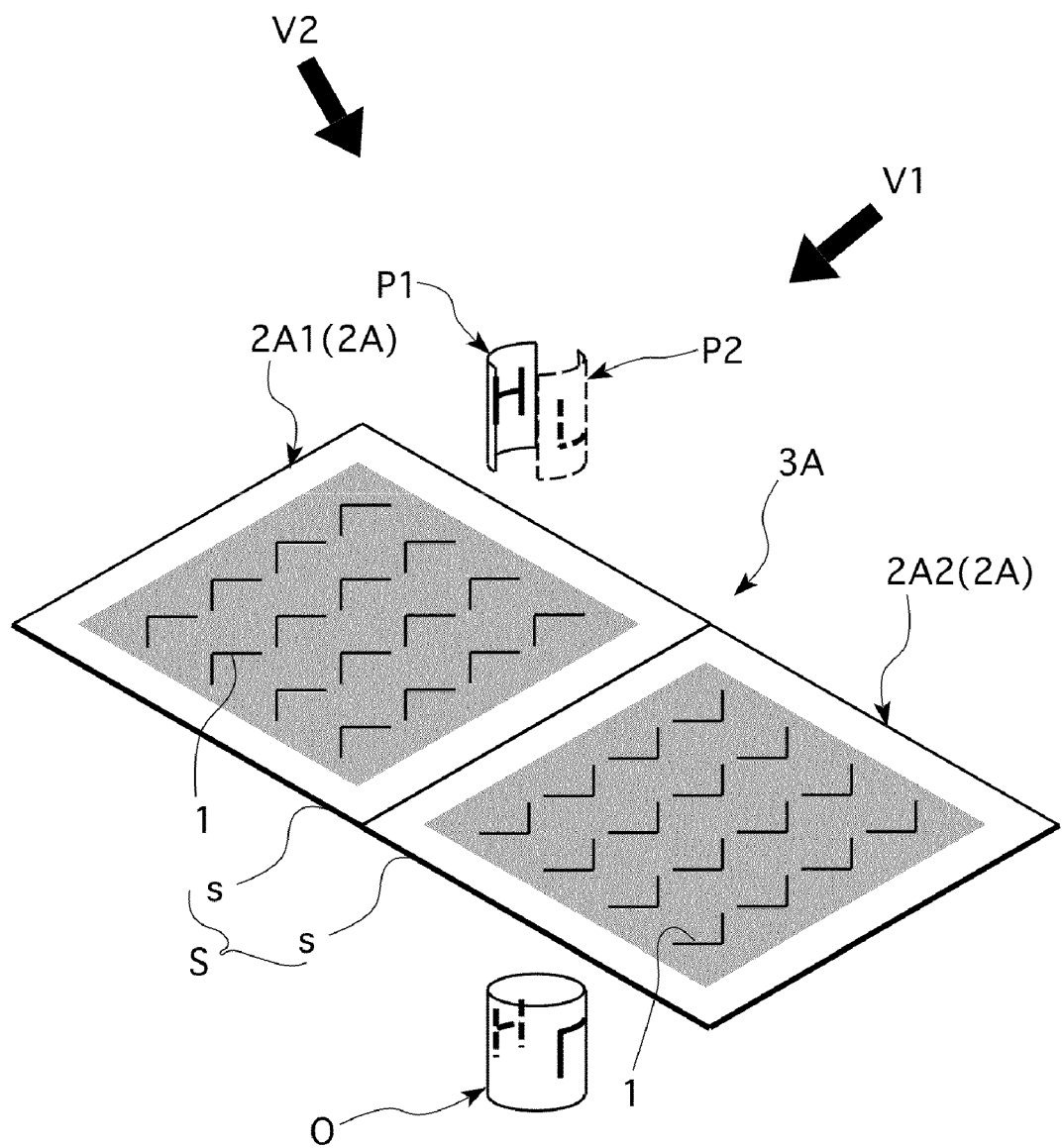
FIG. 12 is a perspective drawing showing schematically an example of the image that is formed for the first embodiment of the present invention, in the case of the object to be projected being a solid object.

Up to this point we have described mainly the case when the object to be projected O is a two-dimensional object or a two-dimensional image; here, referring to FIG. 12, we will describe the case of having a three-dimensional object or a volumetric image as the object to be projected O. In the above-mentioned figure, we explain the example of observing the real image with the multiple viewing-point floating imaging device 3A constructed according to the First Embodiment, with the object to be projected O being a tubular object. In this case, the real image of the object to be projected O, formed by the multiple viewing-point floating imaging device 3A (more precisely, by each dihedral corner reflector array 2A1 and 2A2), will itself arise as explained in the preceding sections; but when observing from the viewing point V1, part of the external (convex) surface of the object to be projected O facing the dihedral corner reflector array 2A1 will appear as the (concave) surface P1 in the real image. On the other hand, when observing from the viewing point V2, part of the external (convex) surface of the object to be projected O facing the dihedral corner reflector array 2A2 will appear as the (concave) surface P2 (shown by dotted lines in the Figure) in the real image. If for example, as shown in the Figure, there is a letter H (shown by dotted lines in the Figure) written on the external surface facing the dihedral corner reflector array 2A1 of the tubular object that is the object to be projected O, and a letter L is written on the surface facing the dihedral corner reflector array 2A2, from the viewing point V1 the letter H will be observed written on the internal surface of the tubular object, and from the viewing point V2, the letter L will be observed written on the internal surface of the tubular object. In other words, convexity and concavity will be reversed with respect to the direction parallel to the optical device plane S, between the object to be projected O, and its real images observed as P1 and P2. It is possible to make use of the above-mentioned reversal of convexity and concavity between the object to be projected O and its real image, by preparing the three-dimensional object to be projected O in such a way, that the convexity and concavity of its surface in the direction parallel to the optical device plane S is already reversed beforehand; thus it becomes possible to make the convexity and concavity of the real image in the correct way as desired.

Figure 13:
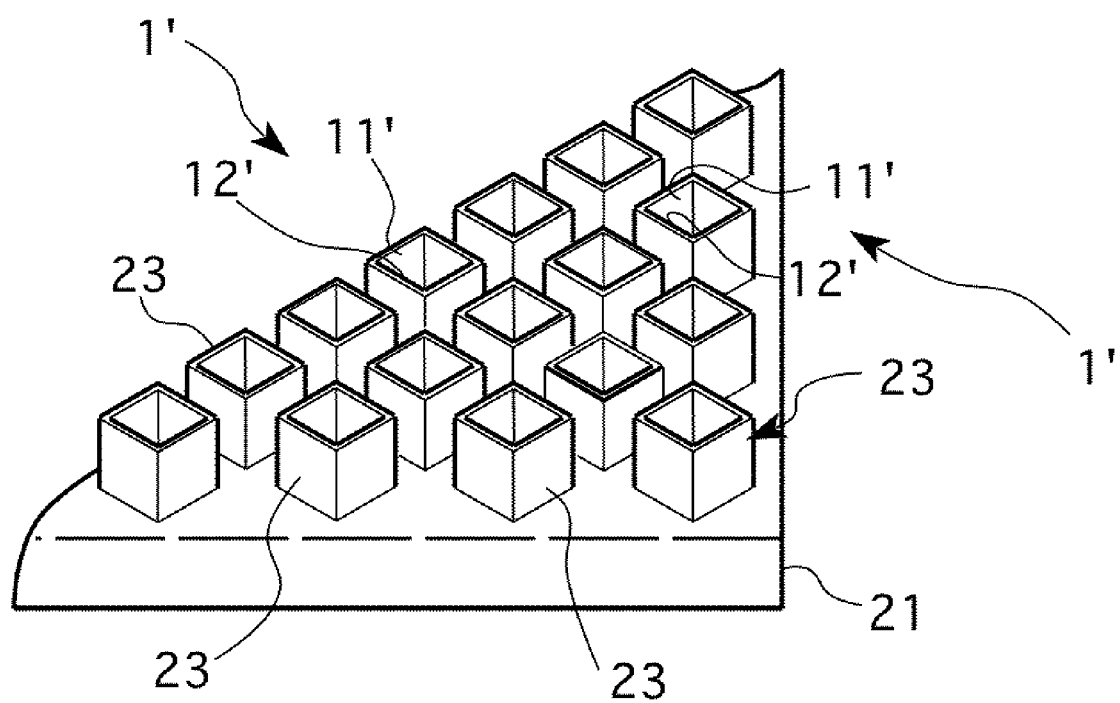
FIG. 13 is a perspective drawing showing another example of the dihedral corner reflector used for the first embodiment of the present invention.

It should be mentioned that the present invention is not restricted to the above-mentioned embodiments. For instance, to realize dihedral corner reflectors for constructing a dihedral corner reflector array, it is enough to have two mutually perpendicular specular surfaces; for the specular surfaces, we might use a metallic or other similar specular surface with mirror-grade surface smoothness, or we might use reflection on a mirror coating; or we might use the effect of total internal reflection along a boundary surface with mirror-grade surface smoothness between two transparent materials with different refraction coefficients. More specifically, for instance in each of the above-mentioned embodiments, the dihedral corner reflector arrays were constructed by creating square holes 22 in a thin plate-shaped substrate 21, with two of their adjacent internal surfaces forming a dihedral corner reflector; but instead of that construction, as shown in FIG. 13, it is possible to form transparent obtrusions 23 on the surface of the substrate 21 in a chessboard pattern, with each obtrusion 23 having two perpendicular surfaces 11' and 12' prepared with mirror finish, thus forming a dihedral corner reflector 1'. These specular surfaces 11' and 12' might make use of total internal reflection, or they might be prepared with mirror coatings. In such a configuration, the other surfaces of the obtrusions besides 11' and 12' might be prepared with non-reflecting properties, or they might be titled, in order to reduce unwanted reflections, thus improving the clarity of the image.

In addition, for each of the above embodiments, it is possible to laminate light controlling optical films on either or both the top and bottom surfaces of the dihedral corner reflector arrays, where the above-mentioned optical films will be used as a means to pass through light rays in specific directions, and block light in other directions; or disperse light in specific directions only. In concrete terms, such optical films can be used to prevent light emitted from the object to be projected to pass directly through the dihedral corner reflector arrays to the viewing point, thus by preventing the viewing of the object to be projected directly through the dihedral corner reflector arrays, they will result in only the light that is reflected twice by the dihedral corner reflectors to pass through the dihedral corner reflector arrays, therefore only the real image of the object to be projected will remain observable in the viewing point. However, it must be noted that the directions where the light should be allowed to pass through and the directions where it should be blocked, will be reversed between the case when the film is laminated on the top side or on the bottom side of the dihedral corner reflector array.

Furthermore, we note that to form a dihedral corner reflector array, it is enough to arrange two mutually perpendicular specular surfaces, that might be placed without contacting each other with some distance between them; also, that the actual shape of the dihedral corner reflector arrays used in the multiple viewing-point floating imaging device might be determined freely; such details of the components are not restricted to the examples shown in the exemplary embodiments above, but might be determined in many similar ways in accordance with the essence of the present invention.

INDUSTRIAL APPLICABILITY

The present invention can be used as a new display device, that allows the observation of the real mirror image of the object to be projected simultaneously from multiple viewing points, that is, observation by several persons at the same time.

I claim:

1. A multiple viewing-point floating imaging device comprising:
    several dihedral corner reflectors consisting of pairs of mutually perpendicular specular surfaces,
    said dihedral corner reflectors being formed along a single optical device plane capable of passing light through it, wherein
    said dihedral corner reflectors being rotated in a plurality of directions around a common axis of rotation that is perpendicular to the said single optical device plane,
    whereas light emitted from an object to be projected that is placed to one side of the said single optical device plane might pass through said single optical device plane by being reflected once each from the two specular surfaces comprising said dihedral corner reflectors,
    whereby forming on the side of said single optical device plane opposite to the said object in a planar symmetric position an image of the said object, said image being observable from multiple viewing points.

2. A multiple viewing-point floating imaging device according to claim 1, wherein the rotating directions of said dihedral corner reflectors formed along said optical device plane are determined randomly.

3. A multiple viewing-point floating imaging device according to claim 1, wherein all said dihedral corner reflectors formed along said optical device plane are formed facing a certain single point.

4. A multiple viewing-point floating imaging device according to claim 1, wherein a plurality of regions are demarcated, with all said dihedral corner reflectors in each said region facing in a single direction, and with the said directions of said regions are different from each other.

5. A multiple viewing-point floating imaging device according to claim 4, wherein said plurality of regions are demarcated according to angles measured from a certain position.

6. A multiple viewing-point floating imaging device according to claim 4, wherein said plurality of regions comprise of mutually independent dihedral corner reflector arrays, said dihedral corner reflector arrays comprising of a plurality of dihedral corner reflectors consisting of pairs of mutually perpendicular specular surfaces formed facing in a single direction along a component device plane capable of passing light through it, whereas light emitted from an object to be projected placed to one side of said component device plane can pass through said component device plane by being reflected once each from said two specular surfaces of said dihedral corner reflectors, whereby forming an image of said object in a planar symmetric position at the side of said component device plane opposite to said object, and with the set of said component device planes forming the said optical device plane.

7. A multiple viewing-point floating imaging device according to claim 1, wherein said dihedral corner reflectors are omitted from regions of said optical device plane that include points where the perpendicular line across said object to be projected crosses said optical device plane.

8. A multiple viewing-point floating imaging device according to claim 1, wherein said dihedral corner reflectors are formed as two mutually orthogonal specular surfaces on two internal surfaces of holes through a flat planar substrate, whereas light passing from one side of said substrate to the other side is reflected once each from said two specular surfaces.

9. A multiple viewing-point floating imaging device according to claim 1, wherein said dihedral corner reflectors are formed as two mutually orthogonal specular surfaces on two internal surfaces of tubes made of transparent material, whereas light passing through said tubes from one surface perpendicular to both said specular surfaces to the other such surface will be reflected once each from said two specular surfaces.

10. A multiple viewing-point floating imaging device according to claim 8, wherein surfaces of said holes or said tubes other than the two said specular surfaces belonging to dihedral corner reflectors are made non-reflecting.

11. A multiple viewing-point floating imaging device according to claim 8, wherein surfaces of said holes or said tubes other than the two said specular surfaces belonging to dihedral corner reflectors are made non-perpendicular to said optical device plane.

12. A multiple viewing-point floating imaging device according to claim 1, wherein a light controlling means capable of transmitting, blocking, or dispersing light coming from certain directions is placed along said optical device plane in such a way, that it allows transmission of light rays contributing to forming the image, while blocking other unwanted light rays.

* * * * *